United States Patent [19]

Robbins

[11] Patent Number: 5,421,590

[45] Date of Patent: Jun. 6, 1995

[54] MULTIPLE LINKED GAME CONTROLLERS

[75] Inventor: George Robbins, Lincoln University, Pa.

[73] Assignee: Commodore Electronics Limited, West Chester, Pa.

[21] Appl. No.: 96,340

[22] Filed: Jul. 23, 1993

[51] Int. Cl.[6] .............................................. A63B 67/00
[52] U.S. Cl. .................................. 273/438; 273/148 B; 345/161; 345/162
[58] Field of Search .................... 273/148 B, 433, 434, 273/438; 345/161, 162

[56] References Cited

U.S. PATENT DOCUMENTS

| | | |
|---|---|---|
| 4,142,180 | 2/1979 | Burson . |
| 4,306,232 | 12/1981 | Burson . |
| 4,373,723 | 2/1983 | Brown et al. . |
| 4,501,424 | 2/1985 | Stone et al. .................. 273/148 B |
| 4,553,222 | 11/1985 | Kurland et al. . |
| 4,572,509 | 2/1986 | Sitrick .............................. 273/85 G |
| 4,588,187 | 5/1986 | Dell ................................. 273/148 B |
| 4,616,829 | 10/1986 | Smack, Sr. et al. . |
| 4,722,526 | 2/1988 | Tovar et al. . |
| 4,738,451 | 4/1988 | Logg . |
| 4,760,527 | 7/1988 | Sidley . |
| 4,924,216 | 5/1990 | Leung ........................ 273/148 B X |
| 4,958,835 | 9/1990 | Tashiro et al. . |
| 4,976,435 | 12/1990 | Shatford et al. ................ 273/148 B |
| 4,976,438 | 12/1990 | Tashiro et al. . |
| 4,998,199 | 3/1991 | Tashiro et al. .................. 364/410 |
| 5,083,800 | 1/1992 | Lockton . |
| 5,092,779 | 3/1992 | Piwonka et al. ................ 434/252 |
| 5,098,110 | 3/1992 | Yang ............................... 273/438 |
| 5,139,261 | 8/1992 | Openiano ...................... 273/148 B |
| 5,186,460 | 2/1993 | Fongeallaz et al. . |

*Primary Examiner*—Vincent Millin
*Assistant Examiner*—Kerry Owens
*Attorney, Agent, or Firm*—Ratner & Prestia

[57] ABSTRACT

Linked game controllers coupled to a single input port of a computer game are configured such that all controllers may be active at the same time. One controller is coupled to an input port on the computer game which has both a parallel-bit interface and a bit-serial interface. This controller provides information on its own control function via the parallel interface and information derived from each of the linked controllers via the serial interface. Each of the controllers includes a flag bit, in the provided information, that indicates whether the controller is the last controller in the sequence of linked controllers. The computer game stores data values provided by the parallel interface and then shifts values provided by the serial interface into an internal register until one of the flag bits, indicating the last controller in the sequence, has been shifted. The shifted data is then separated into different control functions which are then provided to the computer game apparatus.

7 Claims, 3 Drawing Sheets

MULTIPLE LINKED GAME CONTROLLERS

BACKGROUND OF THE INVENTION

The present invention concerns controllers for video games and in particular, controllers which may be linked together to allow multiple active controllers to be simultaneously connected to the video game.

Video games units having controllers which allow one or two individuals to play a video game have been available for many years. Typically such units have one or two input ports. When multiple controllers are coupled to a single port, their use is typically time-division multiplexed such that each player has a distinct time slot in which the game unit responds to only that player's controller. Either the players or the video game unit determines which one of the controllers is active at any given time. Game units having multiple input ports may have more two or more simultaneously active controllers, one for each input port. These game units typically allow only one controller to be connected to each input port at any given time.

An exemplary system which allows multiple controllers to be simultaneously connected to a single input port is disclosed in U.S. Pat. No. 4,588,187 entitled PORT EXPANSION ADAPTER FOR VIDEO GAME PORT, which is hereby incorporated by reference for its teachings on video game controllers. The system described in this patent allows a fixed number of game controllers to be connected to a single port through an adapter module. The controllers are connected in parallel in a wired OR configuration so that, if multiple controllers were active, their control signals would be logically ORed together. Unless the control signals used by these controllers are conveyed on separate input signal lines to the input port, they cannot be simultaneously active. The primary purpose of adapter module, therefore, is to allow a player to use one of several different controllers without having to physically disconnect the previous controller and connect the new controller.

Game units which allow a relatively small number of simultaneously active players are acceptable for the many types of games. To date, this has been a natural limitation because of the relatively low processing power of previous video game units. As video games become more powerful, however, more sophisticated games which allow more than two or three players are being developed. In addition, multiprocessing is being implemented in video game units, allowing multiple games, each having multiple controllers, to be played simultaneously using a single game unit.

Currently, this type of connection is handled in the context of a computer network. An exemplary system of this type is disclosed in U.S. Pat. No. 4,760,527 entitled SYSTEM FOR INTERACTIVELY PLAYING POKER WITH A PLURALITY OF PLAYERS. In the system described in this patent, individual computers are interconnected via an IEEE 488 bus and communication among the computers is controlled from a central processor.

SUMMARY OF THE INVENTION

The present invention is embodied in an electronic game apparatus in which an arbitrary number of controllers are linked in series to a single game port and all of the linked controllers are simultaneously active. In this system, at least one controller may be coupled to an input port on the electronic game to provide a bit-serial data stream to the game. This first controller also includes a serial input port which may be used to link one or more additional controller to the first controller. When so linked, the serial data stream applied to the electronic game by the first controller includes information derived from both the first and additional controllers. Each of the first and additional controllers includes a flag bit in the provided data stream that indicates when that particular controller is the last controller in the sequence of linked controllers.

DETAILED DESCRIPTION

Figure 1:
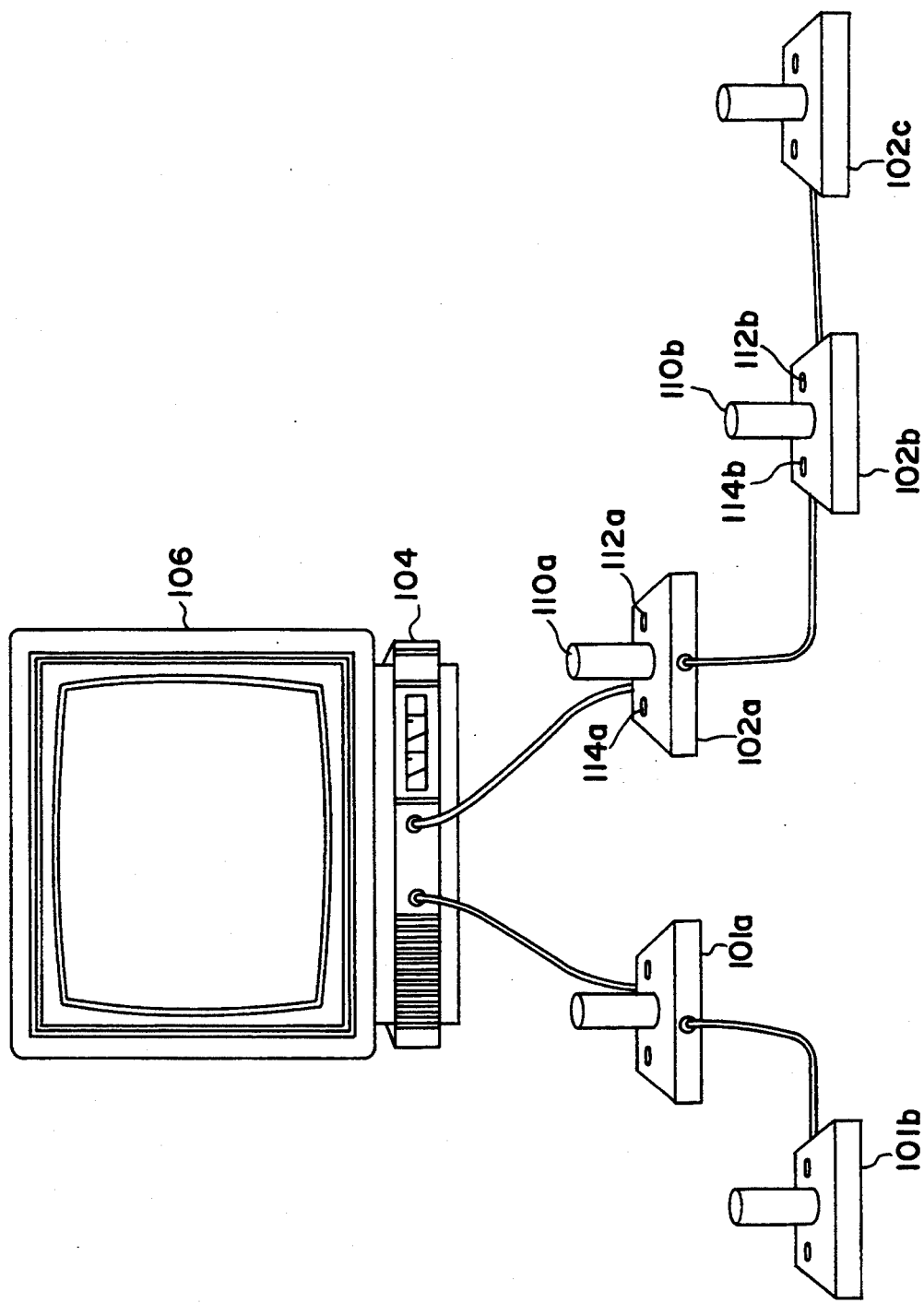
FIG. 1 is a perspective drawing which shows an electronic game that includes an embodiment of the invention.

FIG. 1 is a perspective drawing of an exemplary computer game system which includes an embodiment of the present invention. The game system includes five controllers, 101a, 101b, 102a, 102b and 102c. The controllers are plugged into a processing unit 104 which, in turn, is coupled to a video monitor 106. The processing unit may include a slot (not shown) for accepting a game cartridge, or a magnetic or optical disk drive (not shown) which may be used to load the game software into the processing unit so that the players may play the game.

As shown in FIG. 1, the controllers 101a and 101b; are connected in series as are the controllers 102a, 102b and 102c. The present invention includes apparatus which allows all five of the controllers to be simultaneously active. If, for example, each controller were used to move a respective sprite across a game display, all five sprites could be simultaneously in motion and interacting.

In the exemplary embodiment of the invention, each controller includes a joystick 110 and two buttons 112 and 114 mounted on the body of the controller. It is contemplated, however, that other types of actuators may be used with the controller, such as track balls, mice or keypads. If the controllers use switch actuators such as momentary contact push-button switches, they may be integral with the joystick or mouse.

Figure 2:
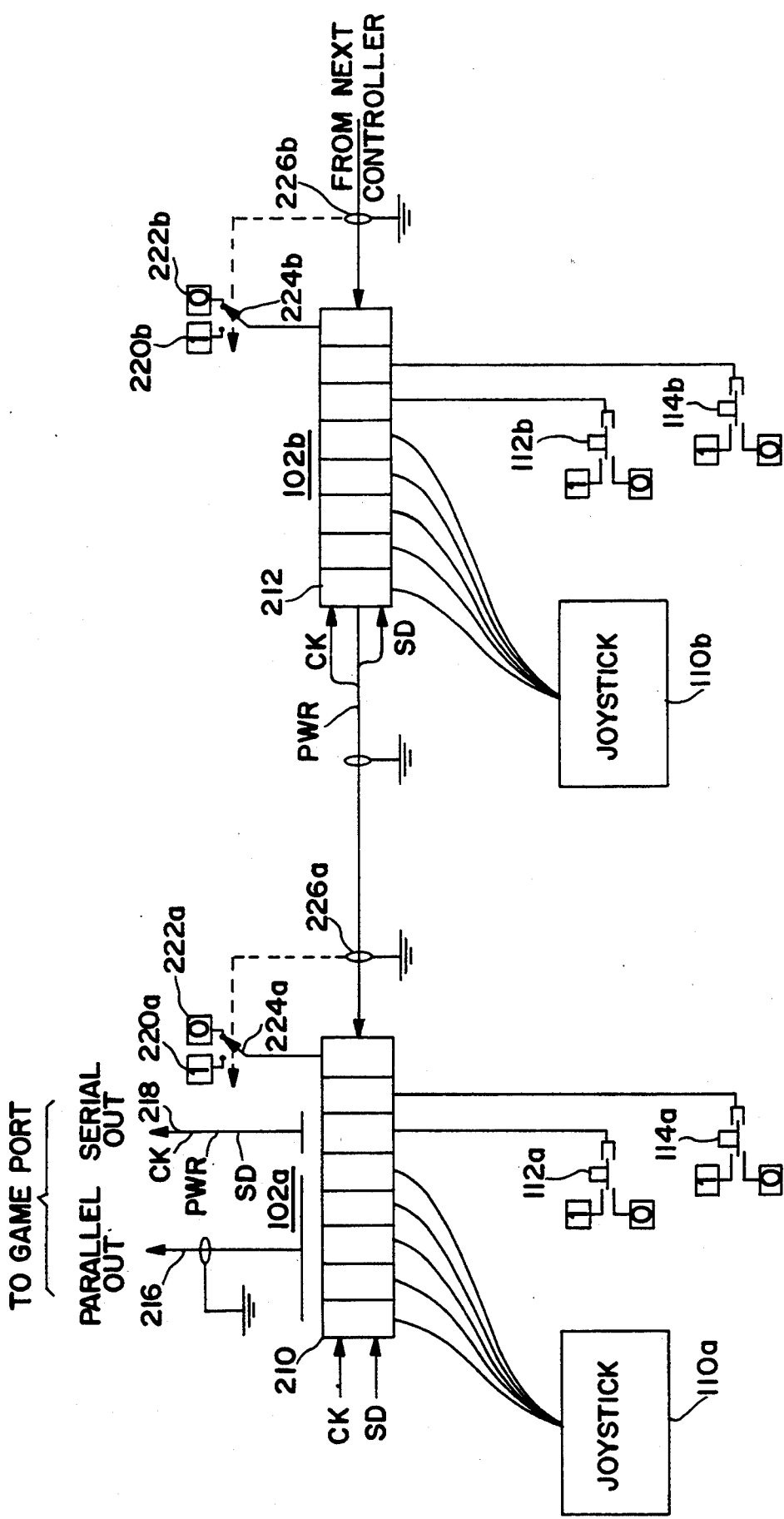
FIG. 2 is a functional block diagram which shows details of tile controllers and how multiple controllers are connected.

FIG. 2 is a functional block diagram which shows details of two of the controllers, 102a and 102b. In the exemplary embodiment of the invention, there may be two types of controllers: ones which connect directly to the processor unit, such as 102a, and those which connect to another controller, such as 102b. It is contemplated, however, that a single type of controller having a single set of input and output interfaces may be used (e.g. data from all controllers would be conveyed to the processor unit via a serial interface) or that each controller may have two types of output interface, one (e.g. a parallel interface) for connecting to the processing unit 104 and the other (e.g. a serial interface) for connecting to another controller.

In the exemplary embodiment of the invention, the controllers which connect directly to the game processor 104 have a five-bit parallel connection 216 which conveys the joystick position information and a bit-serial connection 218 which conveys the state of the switches 112, 114 and 224. The switches 112 and 114 are control switches which may be activated by the player. The switch 224 indicates whether this is the last controller in the sequence or if there are other linked controllers. In this embodiment of the invention, the switch 224 is in a logic-zero state (connected to source 222) if there is another controller connected to this controller and is in a logic-one state (connected to source 220) if this is the last controller in the sequence of controllers (i.e. if no other controllers are connected to the controller). The source 220 may be, for example, a source of operational potential such as a five-volt power supply while the source 222 may be a source of reference potential (e.g. ground).

In operation, the controller which is connected to the game processor 104 transfers the five-bit position value and one of the three switch-state bits (e.g. 112) in a single sampling clock period. In the next two clock periods, the other two switch-state bits (114 and 224) are transferred to the processor 104. If multiple controllers are connected in series, eight bits of data (five bits of position data and three switch state bits) for each of these controllers are shifted into the controller 102a via the connection 214 and are transferred to the processor 104 in series through the serial port 218.

As shown in FIG. 2, the serial connection 218 includes five conductors, a single data line through which bit-serial data is provided to the processor 104, a line through which a clock signal (CK) is conveyed to the controllers, a pair of lines which connect the controllers to a source of operational power (PWR) and to ground and a line that conveys a signal (SD) that enables the registers in each of the controllers to act as a combined shift register. This last signal also inhibits any change in the register contents which may be caused by manipulation of the controllers while the data is being shifted through the controllers.

The central element of each controller is an eight-bit register such as the register 210 of controller 102a. These registers are composed of flip-flops which may be loaded in parallel, for example, through a preset input terminal. Ill addition, the flip-flops are configured as a shift register which is clocked by the clock signal CK provided by the game processor 104 through the serial port 218, as described above. The signal CK is only active when the signal SD is asserted. The signal SD also disables the preset input terminal of each of the flip-flops which make-up the register 210.

As shown in FIG. 2, the connection between controllers conveys switch state information, the clock signal CK as well as operational power and ground from one game controller to the next. In the exemplary embodiment the ground connection is made through a shielding element of the cable 214 that connects the controller 102b to the controller 102a.

As shown in FIG. 2, the position of the switch 224 is determined by plugging the cable 214 from controller 102b into a jack 226 on the controller 102a. As described above, this switch indicates if another controller is connected to provide a bit-serial data stream to the controller 102a. In the exemplary embodiment of the invention, the switch 224 is an integral component of the jack 226. Contact is broken with the source 220 and made with the source 222 by the act of inserting a plug (not shown) at the end of cable 214 into the jack 226.

Alternatively, the arm of the switch 224 may be coupled to ground through a pull-down resistor so that the switch is in contact with source 220 when no plug is in the jack and when the plug is inserted, this connection is broken and the pull-down resistor causes the corresponding bit in the shift register to be set to logic-zero. This construction assumes that the flip-flop which receives the signal from the switch 224 has a high input impedance.

Figure 3:
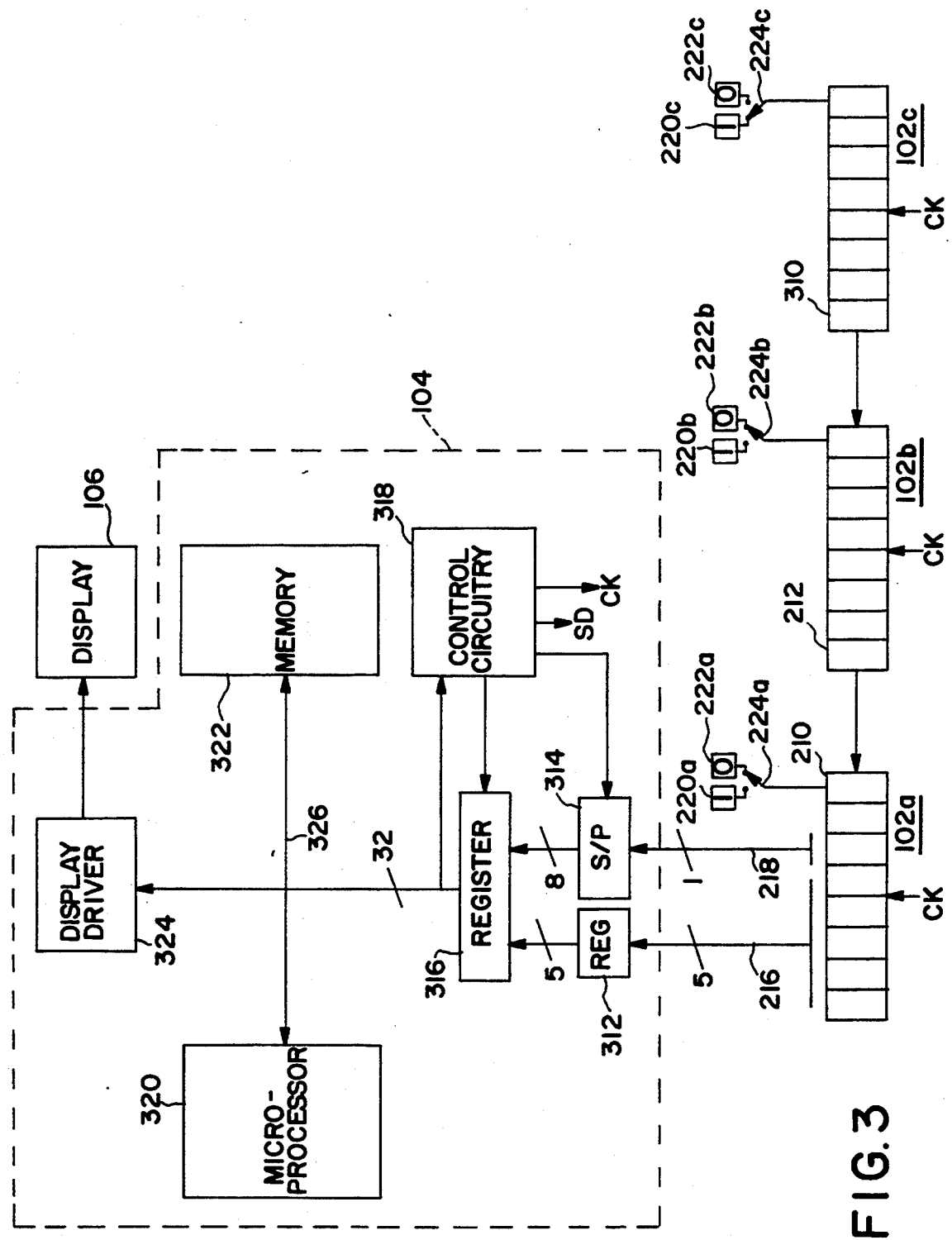
FIG. 3 is a functional block diagram which shows details of the interface between the electronic game apparatus and the controllers.

FIG. 3 is a functional block diagram which illustrates one scheme by which signals from the linked controllers may be provided to a game program running on the game processor 104. As shown in FIG. 3, the game processor 104 includes a microprocessor 320, a memory 322 and a display driver 324. These elements are interconnected by a 32-bit system bus 326 to form a computer which executes the game program.

The system bus 326 also connects the computer to a register 316, through which the game controller signals are provided to the computer, and to control circuitry 318 which directs the flow of signals from the individual game controllers to the computer.

It is contemplated that the control circuitry 318 may operate in two modes, polled and continuous. In the polled mode, data concerning the status of the game controllers is fetched only in response to specific requests for that data from the microprocessor 320. In the continuous mode, the control circuitry 318 sequentially reads the data from each of the controllers and continually updates cells in the memory 322 so that the microprocessor may determine the state of any controller via a memory read operation.

For the purpose of this application, the second mode of operation is assumed. The controller 318, at regular intervals, samples the state of all of the controllers by asserting the signal SD and emitting pulses of the clock signal to cause the linked controllers to shift the contents of their registers to the processor 104 through the parallel port 216 and the serial port 218. As described above, the parallel port 216 is only used to transfer joystick position data from the controller 102a. The switch position data from the controllers 102a, 102b and 102c as well as the joystick position data from the controllers 102b and 102c is transferred via the serial port 218.

The five bits of position data from the controller 102a are stored into a register 312 in response to the first clock pulse emitted by the controller 318. This clock pulse and the following two clock pulses cause the three switch position bits from the controller 102a to be applied to a serial to parallel converter 314. These bits are converted into a three-bit parallel value which is transferred, with the five-bits from the register 312 into the eight most significant bit (MSB) positions of the register 316. In this operation, the five MSB positions of the eight-bit value transferred by the converter 314 are overwritten by the position value held in the register 312.

During the next eight periods of the signal CK, the eight bits from the register 212 of controller 102b are applied to the serial to parallel converter 314 through the serial port 218. After the last of these bits has been transferred, the converter 314 writes an eight-bit value into the eight next most significant bit positions of the register 316. The eight bits from the register 310 of controller 102c are loaded into the next eight bit positions of the register 316 in the same manner.

This process continues until all four bytes of the register 316 have been filled or until a logic-one is detected in the last bit position of an eight-bit value loaded by the serial to parallel converter 314. When either of these events occurs, the control circuitry 318 transfers the contents of the register 316 into one of a set of predetermined locations in the memory 322 using direct memory access (DMA). The control circuitry 318 detects a logic-one in the least significant bit position of the value produced by the converter 314 via the control lines 330.

Although not shown in FIG. 3, the control circuitry 318 may also control circuitry identical to the registers 316 and 312 and serial to parallel converter 314 which loads the signals from the controllers 101a and 101b. These values are loaded into a second set of predetermined memory locations which are reserved for the controllers connected to the second game port.

The disclosed circuitry repeats this process at fixed intervals to continually refresh the data from the game controllers 101 and 102 at the first and second sets of predetermined memory locations. When a computer game, running on the processor 104 needs signals from one of the controllers, it reads the memory cell which contains the byte of data for the one controller. If, as described above, a game allows multiple controllers to be used simultaneously, the processor 104 may periodically read the stored signal values for all of the controllers 101 and 102 and update the game display accordingly.

Although the invention has been described in terms of an exemplary embodiment, it is contemplated that it may be practiced as outlined above within the spirit and scope of the appended claims.

The invention claimed is:

1. Controller apparatus suitable for use with an electronic game device comprising:
   a first controller, configured to be coupled directly to the electronic game device, the first controller including:
   first actuator means, configured to be manipulated, for producing a control signal related to the manipulation;
   first memory means including means for storing the output signal and means for storing a flag signal;
   output means for providing the signal from the memory means to the electronic game device;
   a second controller, removably coupled to the first memory means, the second controller including:
   second actuator means, configured to be manipulated, for producing an output signal related to the manipulation;
   second memory means including means for storing the output signal of the second actuator means; and
   means for coupling the second memory means to the first memory means to provide the signal stored in the second memory means to the electronic game device;
   wherein the flag signal stored in the first memory means has a first value when the second controller is coupled to the first memory means and a second value, different from the first value when the second controller is not coupled to the first memory means.

2. Controller apparatus according to claim 1, further comprising:
   a third controller, removably coupled to the second memory means, the third controller including:
   third actuator means, configured to be manipulated, for producing an output signal related to the manipulation;
   third memory means for storing the output signal of the third actuator means; and
   means for removably coupling the third memory means to the second memory means to provide the signal stored in the third memory means to the electronic game device through the first and second memory means;
   wherein the second memory means further includes, means for storing a further flag signal said further flag signal having the first value when the third memory means is coupled to the second memory means and the second value when the third memory means is not coupled to the second memory means.

3. Controller apparatus according to claim 1, wherein:
   the first actuator means includes a pointing device which may be manipulated to point in one of a plurality of directions and which produces, as the control signal, a plural bit value indicating one of the plurality of directions in which the pointing device is pointed; and
   the output means includes a parallel interface for providing the plural bit value from the pointing device to the electronic game device and a serial interface for providing the flag signal and the signal from the second actuator means to the electronic game device.

4. Controller apparatus according to claim 3, wherein:
   the first actuator means further includes switch means which may be manipulated to be in first and second positions for producing a signal indicating one of the first and second positions; and
   the serial interface is coupled to the switch means to convey the signal produced by the switch means to the electronic game device.

5. Control apparatus for a computer game device having a processor which accesses data in a memory to execute a game program, the control apparatus comprising:
   control input port means for receiving control signals;
   register means for storing control signals received from the control input port means and for providing the stored control signals to the memory;
   a first controller, having an output port through which control signals are provided to the control input port means and having an input port;
   a second controller, having an output port through which control signals generated by the second controller are provided to the input port of the first controller to be provided, through the first controller, to the control input port, the second controller providing, as one of the control signals, a flag signal having a value to indicate that the second controller provides a final control signal to the control input port.

6. Control apparatus according to claim 5, wherein:
   the second controller includes an input port and means, coupled to the input port of the second controller for changing the value of the flag signal to an alternate value which indicates that the second controller does not provide the final control signal to the control input port; and the control apparatus further includes, a third controller, having an output port through which control signals, generated by the third controller, are provided to the input port of the second controller to be appended to the control signals generated by the second controller and which provides a further flag signal as one of the control signals generated by the third controller, said further flag signal having a value to indicate that the third controller provides a final control signal to the control input port.

7. Control apparatus according to claim 6, wherein the first controller includes a parallel interface for providing control signals generated by the first controller to the control input port and a serial interface for providing the control signals generated by the second and third controllers to the control input port.

* * * * *